United States Patent
Vrolijk et al.

(10) Patent No.: US 11,885,436 B2
(45) Date of Patent: Jan. 30, 2024

(54) VALVE MONITORING SYSTEM FOR A COAXIAL DUAL-SAFETY VALVE

(71) Applicant: ebm-papst Landshut GmbH, Landshut (DE)

(72) Inventors: Enno Vrolijk, Dalen (NL); Sebastian Stolz, Ergolding (DE)

(73) Assignee: ebm-papst Landshut GmbH, Landshut (DE)

( * ) Notice: Subject to any disclaimer, the term of this patent is extended or adjusted under 35 U.S.C. 154(b) by 800 days.

(21) Appl. No.: 16/967,773

(22) PCT Filed: Jan. 25, 2019

(86) PCT No.: PCT/EP2019/051911
§ 371 (c)(1),
(2) Date: Aug. 6, 2020

(87) PCT Pub. No.: WO2019/154639
PCT Pub. Date: Aug. 15, 2019

(65) Prior Publication Data
US 2020/0362988 A1    Nov. 19, 2020

(30) Foreign Application Priority Data

Feb. 8, 2018  (DE) .................... 10 2018 102 866.0

(51) Int. Cl.
*F16K 37/00*  (2006.01)
*F16K 1/44*  (2006.01)
*G01M 3/28*  (2006.01)

(52) U.S. Cl.
CPC .......... *F16K 37/0091* (2013.01); *F16K 1/443* (2013.01); *G01M 3/2876* (2013.01)

(58) Field of Classification Search
CPC ... F16K 37/0091; F16K 1/443; G01M 3/2876
USPC ......................................................... 73/1.57
See application file for complete search history.

(56) References Cited

U.S. PATENT DOCUMENTS

| 4,646,556 A * | 3/1987 | Courcoux ........... F16K 37/0083 |
| | | 73/1.72 |
| 9,416,888 B2 * | 8/2016 | Keber .................... F16K 27/00 |
| 2007/0205384 A1 * | 9/2007 | Kurosawa ........... F15B 13/0889 |
| | | 137/455 |
| 2013/0154841 A1 * | 6/2013 | Kucera ................... F23N 1/005 |
| | | 73/40 |

FOREIGN PATENT DOCUMENTS

| CN | 104246239 A | 12/2014 |
| DE | 29511223 U1 | 9/1995 |

(Continued)

OTHER PUBLICATIONS

European Patent Office, Rijswijk, Netherlands, International Search Report of International Application No. PCT/EP2019/051911, dated May 7, 2019, 2 pages.

*Primary Examiner* — Nathaniel T Woodward
(74) *Attorney, Agent, or Firm* — Dickinson Wright PLLC

(57) ABSTRACT

A valve monitoring system for a coaxial dual-safety valve of a gas valve unit that controls a gas request of a gas burner occurring in the course of a heat request. The valve monitoring system including at least the coaxial dual-safety valve and a control valve arranged fluidically connected downstream of the dual-safety valve for controlling the gas quantity.

13 Claims, 1 Drawing Sheet

(56) References Cited

FOREIGN PATENT DOCUMENTS

| | | |
|---|---|---|
| DE | 19826076 C1 | 8/1999 |
| DE | 19831067 A1 | 1/2000 |
| GB | 2 099 158 A | 12/1982 |
| WO | 02/084156 A1 | 10/2002 |
| WO | WO-02084156 A1 * 10/2002 | ............. F16K 1/446 |

* cited by examiner

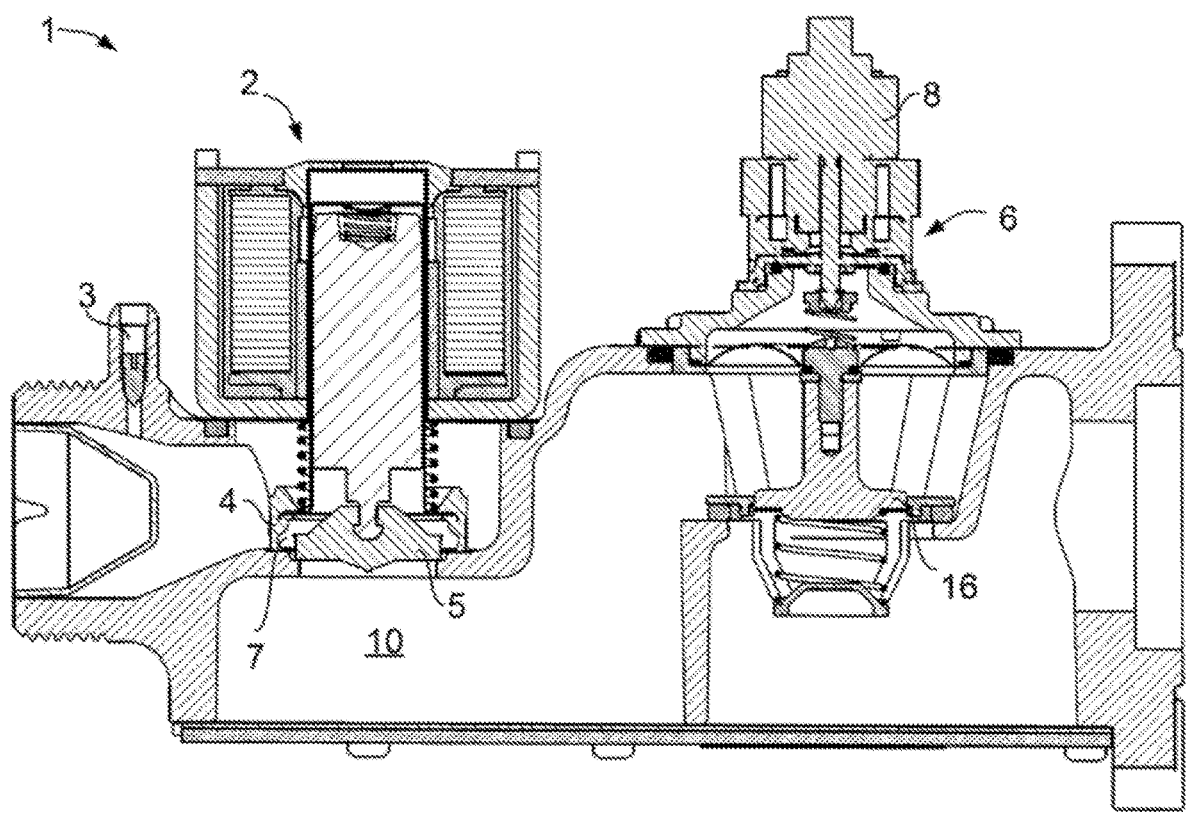

VALVE MONITORING SYSTEM FOR A COAXIAL DUAL-SAFETY VALVE

CROSS REFERENCE TO RELATED APPLICATIONS

This application is a 35 U.S.C. § 371 national phase application of International Application No.: PCT/EP2019/051911, filed Jan. 25, 2019, which claims the benefit of priority under 35 U.S.C. § 119 to German Patent Application No.: 10 2018 102 866.0, filed Feb. 8, 2018, the contents of which are incorporated herein by reference in their entirety.

FIELD

The invention relates to a valve monitoring system for a coaxial dual-safety valve of a gas valve unit which controls a gas request of a gas burner occurring in the course of a heat request. Instead of valve monitoring system, the term "valve proving system (VPS)" is also used in the technology. The invention further relates to methods for monitoring the coaxial dual-safety valve.

BACKGROUND

The statements in this section merely provide background information related to the present disclosure and several definitions for terms used in the present disclosure and may not constitute prior art.

Valve monitoring systems for the tightness check of conventional gas valves or gas valve units with two series-connected safety pilot valves and with a gas pressure monitor are known, wherein such a check occurs, for example, according to the standard EN1643. The tightness check of gas valves with two safety pilot valves arranged in series requires the independent actuation of the individual safety pilot valves as well as their independent opening and closing behavior. Such a method is not directly applicable to a coaxial dual-safety valve, since the two safety pilot valves of the dual-safety valve can only be opened independently of each other under limited conditions.

SUMMARY

An underlying aim of the present disclosure is to provide a valve monitoring system and a method for monitoring for a coaxial dual-safety valve, by means of which the tightness of the two pilot valves of the dual-safety valve can be checked, so that the dual-safety valve can also be used in the case of an application with VPS requirement.

These aims are achieved by the combination of the following features described for a valve monitoring system for a coaxial dual-safety valve (2) of a gas valve unit and methods of monitoring the coaxial dual-safety valve of the valve monitoring system. The valve monitoring system for a coaxial dual-safety valve of a gas valve unit, which controls a gas request of a gas burner occurring in the course of a heat request and comprises at least the coaxial dual-safety valve and a control valve arranged fluidically connected downstream of the dual-safety valve for controlling the gas quantity. The dual-safety valve comprises a first integral pilot valve and a second integral pilot valve arranged coaxially and fluidically downstream of the first pilot valve, which are each controllable only between an open position and a closed position. On the inlet side, a gas inlet pressure acts on the first pilot valve, wherein, in a fluid space formed between the first and the second pilot valves, a pressure sensor measuring a switching pressure or a pressure switch is arranged. Via a check of the switching pressure, successively a tightness check of the second pilot valve and of the first pilot valve occurs in each case depending on an open position or closed position of the control valve and on the open position or closed position of the first and second pilot valves.

According to one aspect of the present disclosure, a method for monitoring the coaxial dual-safety valve of the valve monitoring system, wherein during the gas request in the course of a heat request, the method runs through the steps:

a) the first and the second pilot valves are brought for a predetermined time interval into the open position and immediately thereafter into the closed position,
b) the control valve is brought into the open position,
c) the switching pressure in the fluid space is checked and, for the tightness check of the second pilot valve, is compared with a pressure threshold value,
d) the first and the second pilot valves are brought into the open position,
e) after completion of the gas request, the first and the second pilot valves are brought into the closed position, and then the control valve is brought into the closed position, and
f) the switching pressure in the fluid space is checked and, for the tightness check of the first pilot valve, is compared with a pressure threshold value.

According to another aspect of the present disclosure, a method for monitoring the coaxial dual-safety valve of the valve monitoring system, wherein, during the gas request in the course of a heat request, the method runs through the steps:

i. the first and the second pilot valves are brought for a predetermined time interval into the open position and immediately thereafter into the closed position,
ii. the control valve is brought into the open position,
iii. the switching pressure in the fluid space is checked and, for the tightness check of the second pilot valve, is compared with a pressure threshold value,
iv. the first and the second pilot valves are brought into the open position,
v. after completion of the gas request, the first and the second pilot valves are brought into the closed position, and then the control valve is brought into the closed position, and
vi. the switching pressure in the fluid space is checked and, for the tightness check of the first pilot valve, is compared with a pressure threshold value.

Further areas of applicability will become apparent from the description provided herein. It should be understood that the description and specific examples are intended for purposes of illustration only and are not intended to limit the scope of the present disclosure.

BRIEF DESCRIPTION OF DRAWINGS

In order that the disclosure may be well understood, there will now be described various forms thereof, given by way of example, reference being made to the accompanying drawings, in which:

FIG. 1 shows a diagrammatic cross-sectional view of a gas valve unit with a valve monitoring system.

The drawings are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or corresponding parts and features.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

According to the present disclosure, a valve monitoring system for a coaxial dual-safety valve of a gas valve unit is proposed, which controls a gas request of a gas burner occurring in the course of a heat request and which comprises at least the coaxial dual-safety valve and a control valve arranged fluidically connected downstream of the dual-safety valve for controlling the gas quantity. Such gas burners are used, for example, in gas heaters. A heat request exists, for example, in the case of a need for hot water which starts the gas heater and therefore ignites the burner. The control valve differs from the two pilot valves in that it can be adjusted preferably by means of a step motor in any opening positions and controls the gas flow quantity through the gas valve unit.

The dual-safety valve comprises a first integral pilot valve and a second integral pilot valve arranged coaxially and fluidically downstream of the first pilot valve, which can each be controlled only between an open position and a closed position (ON/OFF pilot valves). The pilot valves are in each case designed as safety valves for the safe interruption of the gas flow. On the inlet side, the gas inlet pressure, in particular directly from the gas line, acts on the first pilot valve.

In a fluid space formed between the first and the second pilot valves, a pressure sensor or pressure switch is arranged, by means of which a switching pressure of the gas enclosed in the fluid space between the first and second pilot valves is measured.

By a check of the measured switching pressure over a predetermined time interval, a tightness check occurs successively first of the second pilot valve and subsequently of the first pilot valve in each case depending on an open position or closed position of the control valve and on the open position or closed position of the first and second pilot valves. By means of the valve monitoring system according to the present disclosure, the advantages of a more cost-effective coaxial dual-safety valve with smaller number of parts, a more compact design as well as lower electrical power can be enhanced by the function of valve monitoring, so that the valve units with coaxial dual-safety valve can also be used in applications with VPS requirement.

Each of the pilot valves and the control valve are designed so that they block the gas flowing through the gas valve unit. Thus, in the direction of flow, between the individual valves, gas and therefore a certain gas pressure can also be confined and measured via the pressure sensor. In addition, the gas inlet pressure always acts on the first pilot valve. To the extent that the measured pressure does not fall below a first pressure threshold value or rise above a pressure threshold value, the valve adjoining the pressure sensor and to be checked is tight.

In an embodiment variant of the valve monitoring system, it is provided that the tightness check of the first and of the second pilot valves occurs after completion of the gas request to the gas valve unit, i.e., after a heat request.

The completion of a heat request here includes that first the fan for supplying the gas-air mixture to the burner is started and flushes the system with air still without gas supply. Subsequently, the two pilot valves of the coaxial dual-safety valve open into the open position for a predetermined time interval, for example, 1 second, while the control valve is still closed. The control valve is then brought into a start-open position (partly open position), and the ignition sequence of the gas burner is started. With the triggering of the ignition spark, the two pilot valves of the dual-safety valve are brought into the open position and the gas burner ignites. As soon as the heat request is completed, first the two pilot valves of the dual-safety valve close completely, and subsequently the control valve also closes. The fan performs a secondary flushing process and is then switched off.

In the valve monitoring system, the tightness check of the first pilot valve occurs after the tightness check of the second pilot valve. The second pilot valve is checked for tightness in that the switching pressure between the first and second pilot valves which are in the closed position is measured, after the control valve has been brought into the start open position. On the outlet side, i.e., a side facing the control valve, environmental pressure, which is lower than the gas inlet pressure enclosed between the two pilot valves, in this situation acts on the second pilot valve. If the measured switching pressure does not fall below the predefined pressure threshold value, the second pilot valve is tight. The first pilot valve is checked for tightness in that the switching pressure between the first and second pilot valves which are in the closed position is measured, after, following the completion of the heat request, first the first pilot valve, then the second pilot valve, and lastly the control valve have been closed. The gas pressure in the fluid space therefore could still escape through the control valve before the second pilot valve is brought into the closed position. Since, on the inlet side, the gas inlet pressure still acts on the first pilot valve, the pressure in the fluid space must not rise above the predefined pressure threshold value. In that case, the first pilot valve is tight. The control valve is thus used according to the present disclosure by the valve monitoring system for the tightness check.

Furthermore, it is provided that the first pilot valve is brought into the closed position immediately before the second pilot valve with a time lag $\Delta t$, wherein the time lag $\Delta t$ is preferably 10-20 ms.

In an alternative design, the valve monitoring system is characterized in that the tightness check of the first pilot valve occurs after completion of the gas request to the gas valve unit, and the tightness check of the second pilot valve is carried out during the gas request to the gas valve unit. In this variant as well, the tightness check of the first pilot valve therefore occurs after the tightness check of the second pilot valve.

The second pilot valve is checked for tightness in that the switching pressure between the first and second pilot valves which are in the closed position is measured. For this purpose, after completion of the heat request and with ignited gas burner, first the control valve is brought into a partial load position, i.e., partially open position, and then immediately and rapidly brought into the closed position. Subsequently, the two pilot valves of the dual-safety valve are brought into the closed position, wherein the first pilot valve is closed immediately before the second pilot valve. The control valve is then opened again, so that, on the outlet side, i.e., on a side facing the control valve, in this situation, the environmental pressure, which is lower than the gas inlet pressure enclosed between the two pilot valves, acts on the second pilot valve. If the measured switching pressure does not fall below the predefined pressure threshold value, the second pilot valve is tight. Subsequently, the first pilot valve is checked for tightness. For this purpose, the second pilot valve is opened briefly for the degassing of the fluid space and is closed again. Thus, environmental pressure also prevails in the fluid space. Thereafter, the switching pressure between the first and second pilot valves which are in the closed position is measured. Since, on the inlet side, the gas inlet pressure continues to act on the first pilot valve, the pressure in the fluid space must not exceed the pressure threshold value. In that case, the first pilot valve is tight. In this design variant as well, the control valve is used by the valve monitoring system for the tightness check.

Thus, two alternative variants for checking the coaxial dual-safety valve are available.

According to one aspect, the present disclosure, relates to the method for monitoring the coaxial dual-safety valve of the above valve monitoring system according to the first design variant, wherein, during the gas request in the course of the heat request, the method runs through the following steps.

First, the first and the second pilot valves are brought for a predetermined time interval, in particular 1 second, into the open position and immediately thereafter into the closed position. Subsequently, the control valve is shifted into the open position.

The switching pressure in the fluid space is measured or checked and, for the tightness check of the second pilot valve, is compared with a predefined pressure threshold value. The pressure threshold value can be defined, for example, as the difference between half of the gas nominal pressure and the switch hysteresis pressure (Pswitch=½ Pnominal−Pswitch−hysteresis) of the pilot valve. The pressure threshold value must not be undershot, in which case the second pilot valve is tight.

Subsequently, the first and the second pilot valves of the dual-safety valve are brought into the open position, so that the gas path through the valve unit to the gas burner is opened and the heat request can be completed.

After completion of the gas request or heat request, the first and the second pilot valves are brought into the closed position, wherein the first pilot valve always closes chronologically immediately before the second pilot valve. Subsequently, the control valve is also closed. Then, the switching pressure in the fluid space is checked and, for the tightness check of the first pilot valve, is compared with a predefined pressure threshold value. This pressure threshold value can be defined, for example, as half of the gas nominal pressure (Pswitch=½ Pnominal) and must not be exceeded, in which case the first pilot valve is tight.

With regard to the second embodiment variant of the valve monitoring system, a method for monitoring the coaxial dual-safety valve is also proposed. The method then occurs after the completion of the gas request in the course of the heat request to the gas valve unit and runs through the following steps.

With opened dual-safety valve opened, the control valve is first shifted into a partly open position (partial load operation) and then immediately and directly into the closed position. The shift from the partly open position into the closed position occurs preferably by means of a step motor, preferably within at most 0.5 seconds. It blocks the gas path, which has been open until then for completion of the gas request, in the gas valve unit. Subsequently, the first and the second pilot valves are successively brought into the closed position, wherein the first pilot valve is always closed before the second pilot valve. The control valve is then shifted back into the open position. Subsequently, the switching pressure in the fluid space is checked and, for the tightness check of the second pilot valve, is compared with a pressure threshold value. The pressure threshold value can be defined, for example, as the difference between half the gas nominal pressure and the switch-hysteresis pressure (Pswitch=½ Pnominal−Pswitch−hysteresis). The pressure threshold value must not be undershot, in which case the second pilot valve is tight.

The second pilot valve is then brought into the open position for the at least partial degassing, while the first pilot valve remains in the closed position. The switching pressure in the fluid space is checked and, for the tightness check of the first pilot valve, is compared with a pressure threshold value. This pressure threshold value can be defined, for example, as half of the gas nominal pressure (Pswitch=½ Pnominal) and must not be exceeded, in which case the first pilot valve is tight.

In the method, it is advantageous if the second pilot valve, after the at least partial degassing, is brought immediately thereafter into the closed position, before the switching pressure in the fluid space is checked.

Other advantageous developments of the present disclosure are characterized or represented in further detail below together with the description of one embodiment in reference to FIG. 1.

Referring now to FIG. 1, a diagrammatic view of a valve monitoring system for a coaxial dual-safety valve 2 of a gas valve unit 1 is represented. The gas valve unit 1 comprises a gas inlet 3 which is connected to the gas line (not represented). Successively in the flow direction are the first pilot valve 4 and the second pilot valve 5 of the coaxial dual-safety valve 2 and then the control valve 6 with the valve body 16. The first and the second pilot valves 4, 5 each comprise a valve body as well as a valve seat and form between themselves the fluid space 7 in which the pressure sensor measuring the switching pressure is arranged. The control valve 6 also comprises a valve body and a valve seat, wherein the open position of the valve body is adjusted via the step motor 8. The mixing unit for providing the gas/air mixture to the burner (not represented) follows the control valve 6 in the flow direction. In the area of the gas inlet 3, the gas inlet pressure (gas nominal pressure) of the gas line prevails. In the case of closed dual-safety valve 2 and opened control valve 6, environmental pressure prevails in the area of the control valve 6 and therefore on the outlet side at the second pilot valve 5.

In the valve monitoring system, a tightness check of the first pilot valve 4 and of the second pilot valve 5 occurs using the control valve 6 and the gas inlet pressure which is always applied on the inlet side.

Here, the valve unit 1 can ensure the two variants of the tightness check and therefore of the valve monitoring of the dual-safety valve 2.

In the first variant, the first and second pilot valves 4, 5, during a gas request in the course of a heat request, are briefly opened and subsequently closed again, wherein the first pilot valve 4 is brought into the closed position before the second pilot valve 5 with a time lag Δt=10-20 ms. Here, the control valve 6 at first is still closed, so that the gas inlet pressure acts against the control valve 6 as long as the dual-safety valve 2 is open. After the closing of the first and second pilot valves 4, 5, the control valve 6 is brought into the partly open start position. The second pilot valve 5 is checked for tightness in that the switching pressure in the fluid space 7 between the first and second pilot valves 4, 5 which are in the closed position is measured for preferably 0.4 seconds. Due to the opening of the control valve 6, the gas pressure on the outlet side, i.e., on the side 10 facing the control valve 6, decreases to environmental pressure which is lower than the gas pressure enclosed in the fluid space 7 between the two pilot valves 4, 5. If the measured switching pressure does not fall below the predefined pressure threshold value, the second pilot valve is tight. Subsequently, the heat request is completed in that the dual-safety valve opens and the gas burner ignites. After completion of the heat request, the first and second pilot valves 4, 5 close and subsequently the control valve 6 closes, so that the gas pressure in the fluid space 7 can escape through the control valve 6 before the second pilot valve 5 is brought into the closed position. Next the tightness check of the first pilot valve 4 occurs while, on the inlet side, the gas inlet pressure acts exclusively on the first pilot valve 4. The switching pressure in the fluid space 7 between the first and second pilot valves 4, 5 which are in the closed position is measured preferably for 0.2 seconds and must not fall below the pressure threshold value. In that case, the first pilot valve 4 is tight.

Alternatively, the valve unit 1 is used for the valve monitoring system after full completion of a heat request. In this second variant, with dual-safety valve 2 completely open, the control valve 6 is first shifted into a partly open position (partial load operation) and subsequently it is brought immediately and directly, preferably at a frequency of 400 Hz, in 0.5 seconds, into the closed position by means of the step motor 8. The control valve 6 blocks the gas path, which has been open until then for completion of the gas request, in the gas valve unit 1. Subsequently, first the first pilot valve 4 and then the second pilot valve 5 are successively brought into the closed position. The control valve 6 is then opened again, so that the pressure on the side 10 of the second pilot valve 5 facing the control valve 6 falls to environmental pressure. Subsequently, for the tightness check of the second pilot valve 5, the switching pressure in the fluid space 7 is measured via the pressure sensor 7 preferably for 0.4 seconds and compared with the predefined pressure threshold value (for example, (Pswitch=½ Pnominal−Pswitch−hysteresis). To the extent that the pressure threshold value is not undershot, the second pilot valve 5 is tight. Subsequently, the second pilot valve 5 is brought briefly into the open position for degassing, while the first pilot valve 4 remains in the closed position. The switching pressure in the fluid space 7 as a result falls to environmental pressure. Since, on the inlet side, the gas inlet pressure continues to act on the first pilot valve 4, the control pressure measured preferably for 0.2 seconds must not rise above a predefined pressure threshold value (for example, Pswitch=½ Pnominal). In that case, the first pilot valve 4 is tight, and the tightness check has been successfully completed.

While the above description constitutes the preferred embodiments of the present invention, it will be appreciated that the invention is susceptible to modification, variation and change without departing from the proper scope and fair meaning of the accompanying claims.

What is claimed is:

1. A valve monitoring system for a coaxial dual-safety valve of a gas valve unit, which controls a gas request of a gas burner occurring in the course of a heat request and which comprises at least the coaxial dual-safety valve and a control valve arranged fluidically connected downstream of the dual-safety valve for controlling the gas quantity,
   wherein the dual-safety valve comprises a first integral pilot valve and a second integral pilot valve arranged coaxially and fluidically downstream of the first pilot valve, which are each controllable only between an open position and a closed position,
   wherein, on the inlet side, a gas inlet pressure acts on the first pilot valve, wherein, in a fluid space formed between the first and the second pilot valves, a pressure sensor measuring a switching pressure or a pressure switch is arranged, and
   wherein, the system is configured such that a check of the switching pressure, successively a tightness check of the second pilot valve and of the first pilot valve occurs in each case depending on an open position or closed position of the control valve and on the open position or closed position of the first and second pilot valves;
   wherein the system is configured such that first pilot valve is brought into the closed position directly before the second pilot valve with a time lag ($\Delta t$).

2. The valve monitoring system according to claim 1, characterized in that the system is configured such that the tightness check of the first and of the second pilot valves occurs after completion of the gas request to the gas valve unit.

3. The valve monitoring system according to claim 1, characterized in that the system is configured such that the tightness check of the first pilot valve occurs after completion of the gas request to the gas valve unit, and the tightness check of the second pilot valve occurs during the gas request to the gas valve unit.

4. The valve monitoring system according to claim 1, characterized in that the system is configured such that the tightness check of the first pilot valve occurs after the tightness check of the second pilot valve.

5. The valve monitoring system according to claim 1, characterized in that the system is configured such that, during the tightness check of the second pilot valve, the control valve is in the open position and, in the process, an environmental pressure acts at the outlet side on the second pilot valve.

6. The valve monitoring system according to claim 1, characterized in that the time lag is 10-20 ms.

7. The valve monitoring system according to claim 1, characterized in that the dual-safety valve and the control valve are provided directly adjoining one another in the flow direction.

8. A method for monitoring the coaxial dual-safety valve of the valve monitoring system according to claim 1, wherein, during the gas request in the course of a heat request, the method runs through the steps:
   a) the first and the second pilot valves are brought for a predetermined time interval into the open position and immediately thereafter into the closed position,
   b) the control valve is brought into the open position,
   c) the switching pressure in the fluid space is checked and, for the tightness check of the second pilot valve, is compared with a pressure threshold value,
   d) the first and the second pilot valves are brought into the open position,
   e) after completion of the gas request, the first and the second pilot valves are brought into the closed position, and then the control valve is brought into the closed position, f) the switching pressure in the fluid space is checked and, for the tightness check of the first pilot valve, is compared with a pressure threshold value.

9. A method for monitoring the coaxial dual-safety valve of the valve monitoring system according to claim 1, wherein, after the completion of the gas request in the course of the heat request to the gas valve unit, the method runs through the steps:
  i. the control valve is brought into the closed position and blocks the heretofore open gas path in the gas valve unit,
  ii. the first and the second pilot valves are brought into the closed position,
  iii. the control valve is brought back into the open position,
  iv. the switching pressure in the fluid space is checked and, for the tightness check of the second pilot valve, is compared with a pressure threshold valve,
  v. the second pilot valve is brought into the open position for the at least partial degassing into the open position, while the first pilot valve remains in the closed position,
  vi. the switching pressure in the fluid space is checked and, for the tightness check of the first pilot valve, is compared with a pressure threshold value.

10. The method according to claim 9, characterized in that, according to step e), the second pilot valve after the at least partial degassing is brought immediately thereafter into the closed position, before the switching pressure in the fluid space is checked.

11. The method according to claim 9, characterized in that the first and the second pilot valves are successively brought into the closed position, wherein the first pilot valve is closed directly before the second pilot valve is closed.

12. The method according to claim 9, characterized in that in step i) the control valve is brought immediately and directly from a partly open position into the closed position.

13. A gas valve unit with a valve monitoring system according to claim 1.

* * * * *